United States Patent
Zhao et al.

(10) Patent No.: US 6,348,921 B1
(45) Date of Patent: Feb. 19, 2002

(54) SYSTEM AND METHOD FOR DISPLAYING DIFFERENT PORTIONS OF AN OBJECT IN DIFFERENT LEVELS OF DETAIL

(76) Inventors: Ze Hong Zhao, 3360 Milton Ct., Mountain View, CA (US) 94040; Michael T. Jones, 1661 Via Campagna, San Jose, CA (US) 95120; Lee Robert Willis, 232 Hagamann Dr., Livermore, CA (US) 94550

(*) Notice: Subject to any disclaimer, the term of this patent is extended or adjusted under 35 U.S.C. 154(b) by 0 days.

(21) Appl. No.: 09/070,808

(22) Filed: May 1, 1998

Related U.S. Application Data

(63) Continuation-in-part of application No. 08/899,123, filed on Jul. 23, 1997, now abandoned, which is a continuation-in-part of application No. 08/749,285, filed on Nov. 13, 1996, now abandoned, which is a continuation-in-part of application No. 08/833,845, filed on Apr. 10, 1997, now Pat. No. 6,018,347

(60) Provisional application No. 60/015,354, filed on Apr. 12, 1996, and provisional application No. 60/015,389, filed on Apr. 12, 1996.

(51) Int. Cl.[7] ............................................. G06T 17/00
(52) U.S. Cl. ........................ 345/428; 345/429; 345/433
(58) Field of Search .................................. 345/428, 429

(56) References Cited

U.S. PATENT DOCUMENTS

| | | | | |
|---|---|---|---|---|
| 4,291,380 A | | 9/1981 | Rohner ........................ | 364/522 |
| 4,646,251 A | | 2/1987 | Hayes et al. ................. | 364/518 |
| 4,715,005 A | | 12/1987 | Heartz ........................ | 364/521 |
| 4,727,365 A | | 2/1988 | Bunker et al. ............... | 340/728 |
| 4,821,212 A | | 4/1989 | Heartz ........................ | 364/521 |
| 4,888,713 A | | 12/1989 | Falk ............................ | 364/522 |
| 4,912,659 A | | 3/1990 | Liang .......................... | 364/521 |
| 4,912,664 A | | 3/1990 | Weiss et al. ................. | 364/577 |
| 4,933,889 A | | 6/1990 | Meshkat et al. ............. | 364/578 |
| 5,367,615 A | | 11/1994 | Economy et al. ........... | 395/129 |
| 5,448,686 A | * | 9/1995 | Borrel et al. ................ | 395/120 |
| 5,963,209 A | * | 10/1999 | Hoppe ........................ | 345/419 |
| 5,999,187 A | * | 12/1999 | Dehmlow et al. .......... | 345/420 |

OTHER PUBLICATIONS

Beier et al., "Feature–Based Image Metamorphosis", *Computer Graphic*, Jul., 1992, pp. 35–42.

Ferguson et al., "Continuous Terrain Level Of Detail For Visual Simulation", Presented at the *Image V Conference, Phoenix, Arizona*, Jun. 19–22, 1990, pp. 1–8.

Fournier et al., "Computer Rendering of Stochastic Models", *Communications of the ACM*, vol. 25, No. 6, Jun., 1982, pp. 371–384.

Fournier et al., "Comment on Computer Rendering of Fractal Stochastic Models", *Communications of the ACM*, vol. 25, No. 8, Aug., 1982, pp. 581–584.

Jones, M., "Lessons Learned from Visual Simulation" *Designing Real–Time 30 Graphics for Entertainment Siggraph '95 Course #6*, May, 1995, pp. 2–1—2–34.

Willis et al., "A Method For Continuous Adaptive Terrain", Presented at the *1996 Image Conference, Scottsdale, Arizona*, Jun. 23–28, 1996, pp. 1–5.

* cited by examiner

*Primary Examiner*—Almis R. Jankus
*Assistant Examiner*—G. F. Cunningham

(57) ABSTRACT

A data structure provides a framework for relating the levels of detail (LOD) of an object having multiple LODs. A designer is provided the flexibility to display different portions of an object in multiple LODs. An object is stored in different LODs. Each LOD includes one or more polygons, with each polygon representing a portion of the object. An example tree data structure includes nodes which correspond to portions of the object. All nodes at a particular level together represent an object at a corresponding LOD. A function is provided for each edge of a geometrical entity in each node. The functions are weighted according to several factors/attributes. The functions are evaluated dynamically to determine whether to replace a polygon with polygons at a finer LOD. By a proper choice of the functions in different nodes, different portions of the object may be displayed at different LODs.

24 Claims, 9 Drawing Sheets

SYSTEM AND METHOD FOR DISPLAYING DIFFERENT PORTIONS OF AN OBJECT IN DIFFERENT LEVELS OF DETAIL

RELATED APPLICATIONS

This application is a continuation-in-part of U.S. application Ser. No. 08/899,123, filed Jul. 23, 1997, which is a continuation-in-part of U.S. application Ser. No. 08/749, 285, filed Nov. 13, 1996, (now abandoned); and further is a continuation-in-part of U.S. Application No. 08/833,845, filed Apr. 10, 1997 (now U.S. Pat. No. 60/015,354), which itself claims the benefit of U.S. Provisional Applications No. 60/015,354, filed Apr. 12, 1996, and No. 60/015,389, filed Apr. 12, 1996.

CROSS-REFERENCE TO OTHER APPLICATIONS

The following applications contain some common disclosure with that of the present application:

U.S. Patent Application entitled "A System and Method for Storing and Accessing Data Representative of an Object in Various Levels-of-Detail," Ser. No. 08/749, 287, filed Nov. 13, 1996, incorporated herein by reference; and U.S. Patent Application entitled "Providing a Framework for Level-of Detail Transformations," Ser. No. 08/749, 275, filed Nov. 13, 1996, incorporated herein by reference.

BACKGROUND OF THE INVENTION

1. Field of the Invention

The present invention relates generally to the field of graphics systems, and more particularly to a system and method for displaying an object in different levels of detail.

2. Related Art

Graphics systems are often used to display images of objects. A graphics system may store data representative of an object and display an image of the object using the stored data. Such a system may store several representations of an object, with each representation having a different level of detail (LOD). Data representations which have more detail are generally termed as finer LODs and data representations which have a lesser amount of detail may be termed as coarser LODs.

The amount of detail stored in different LOD representations may be appreciated by drawing an analogy to the detail perceived by an observer while observing an object. For example, very little detail may be perceived by an observer while watching an automobile from a distant aircraft. On the other hand, several details such as the doors, windows, mirrors will be perceived if the observer is standing sufficiently close to the automobile. A finer LOD may include such additional details also. Additional details generally provide 'realism' to the view of an object.

A graphics system may display an object using more than one LOD. A user may wish to display some portions of an object at one LOD while displaying other portions at another LOD, for example, to have realism in some portions, while conserving resources at portions which do not need realism.

What is therefore needed is providing a user the flexibility to display different portions of an object at different LODs.

SUMMARY OF THE INVENTION

The present invention is directed to a system and method for displaying different portions of an object in different levels of detail (LODs). An object is represented in a plurality of LODs. Each LOD includes one or more geometrical entities (e.g., edges, polygons). An embodiment in accordance with the present invention associates a data structure (for example, a tree) with the LOD representations of an object. The data structure specifies a relationship of each of the geometrical entities in an LOD to geometrical entities in different (i.e., finer and/or coarser) LODs. By using the relationships, an object may be displayed using multiple LODs.

To allow such display, one or more functions are provided with each geometrical entity (e.g., triangle) in the present invention. In one embodiment, a function is provided for each edge of the geometrical entity. In another embodiment, a single function is provided for the whole geometrical entity. The function corresponding to a geometrical entity is evaluated to generate at least one morph weight for the geometrical entity. A determination is made whether to replace one geometrical entity with another geometrical entity (or entities) at a different LOD according to the morph weights generated.

In one embodiment, a function may include several variables such as, for example, distance, light etc., with each variable being assigned a corresponding weight. Each variable has a value assigned to it. A variable may be assigned a different value before the evaluation of the corresponding function. A function is evaluated according to the values of the variables and the respective weights associated with the variables.

The morph weight generated from such an evaluation is used to determine whether to replace a geometrical entity in one LOD with geometrical entities in another LOD. Thus, depending on the definition of each function (i.e., variables and corresponding weights) and the values of the variables at the time of evaluation, different portions of the object may be displayed at different LODs.

The present invention ensures that no adjacent polygons are rendered with an LOD difference of more than a predetermined number (e.g., 1). In one embodiment of the present invention, a function is associated with each edge of a polygon. To ensure that no two adjacent polygons are rendered with an LOD difference of more than the predetermined number, the embodiment begins traversal of the data structure at the top (i.e., at coarsest level) and continues the traversal in a breadth-first fashion.

In another embodiment of the present invention, a function is associated with each polygon. The embodiment generates a proposed set of polygons to be rendered based on the morph weights generated for the corresponding polygons. That is, the polygons are recursively replaced by polygons at finer LOD so long as the function of each polygon returns a value of COMPLETE_MORPH. To ensure that no two adjacent polygons are rendered with a difference in LOD levels greater than a predetermined value (e.g., one), a polygon at the coarsest of resolution in the proposed set is selected. All polygons in the proposed set which have at least one shared edge with the selected polygon are then determined. If the difference of LOD levels of the selected polygon and any of the polygons with a shared edge is greater than 1, the polygon with the shared edge is deleted from the proposed set and the parent of the deleted polygon is added into the proposed set. The selected polygon and the parent polygons are both added to the proposed set and the above steps are performed recursively until there are no polygons with an LOD difference of more than one. The polygons remaining constitute a final set. The geometrical entities (polygons) in the final set are rendered to generate a display corresponding to the object.

One advantage of the invention is that it enables different portions of the object to be displayed at different LOD levels. In one embodiment, this is accomplished by providing one or more functions for each geometrical entity.

Another advantage of the present invention is that it ensures a smooth transition between the boundaries of portions which are rendered at different resolutions. In one embodiment, this is accomplished by ensuring that no adjacent polygons are rendered with an LOD difference of greater than one.

Yet another advantage of the present invention is that it minimizes the adverse impacts of the so-called "T-vertices" phenomenon. In one embodiment this is accomplished by subdividing a polygon having a T-vertex on one of its edges into two or more coplanar polygons.

Thus, the present invention enables a designer to define a data structure associated with different LOD representations of an object. By an appropriate selection of the variables and associated weights within a function, the designer may cause different portions of an object to be displayed at different LODs.

BRIEF DESCRIPTION OF THE FIGURES

The present invention is pointed out with particularity in the appended claims. The above and further features and advantages of the present invention may be better understood by referring to the following description taken in conjunction with the accompanying drawings, in which:

DETAILED DESCRIPTION OF THE PREFERRED EMBODIMENTS

The present invention is a system and method for displaying an object in multiple LODs. In a preferred embodiment, the present invention determines which polygons should be rendered (and therefore which LODs should be used) to display the object. This determination can be made when displaying the object for the first time, or after a variable affecting the display of the object (e.g., viewpoint, range, lighting) has changed.

The present invention provides a data structure which defines relationships between portions of an object represented in several LODs. The determination of which LOD to use for a particular portion of an object is based on the evaluation of a function preferably provided in the data structure. By an appropriate design of the functions, a designer may selectively cause different portions of an object to be displayed in different LODs.

Figure 1:
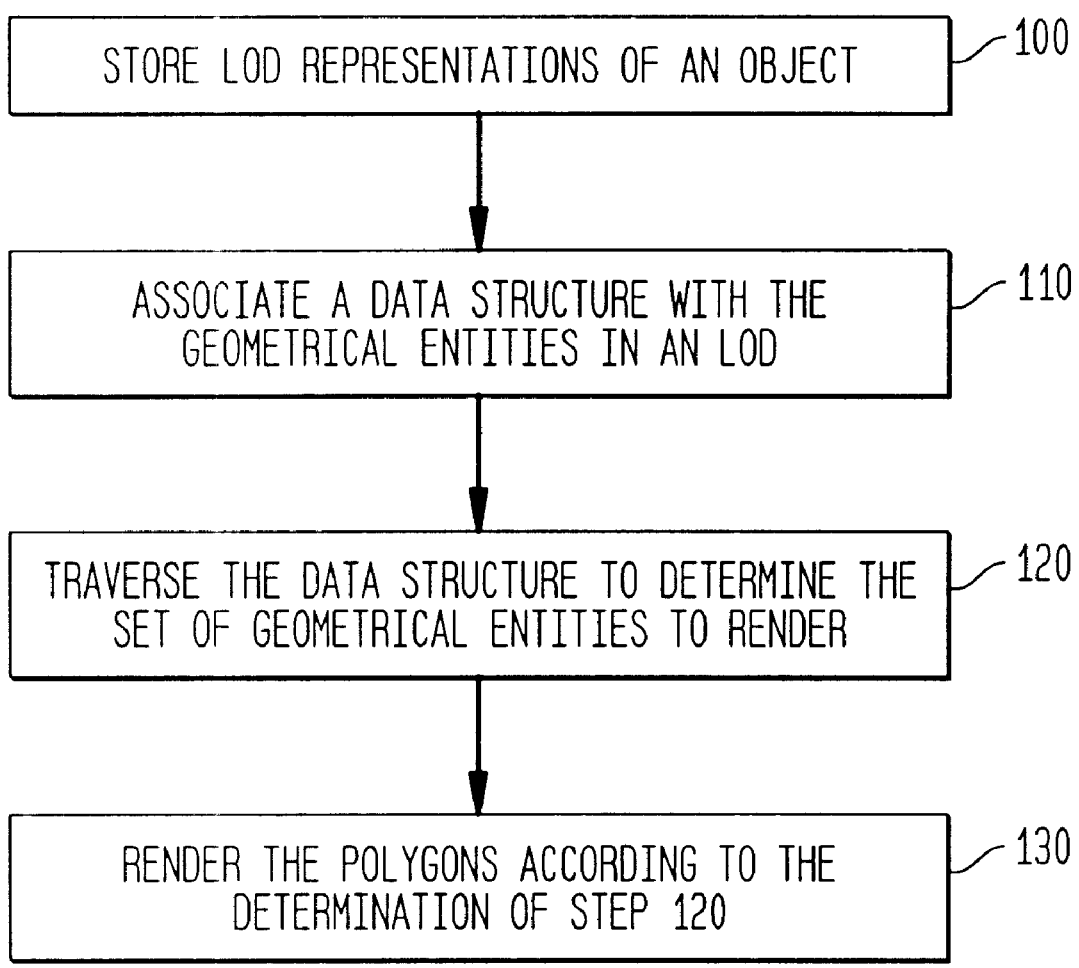
FIG. 1 is a flowchart illustrating a process for displaying different portions of an object at different LODs in one embodiment of the present invention.

FIG. 1 is a flowchart illustrating a process for displaying an object according to a data structure provided by a user. In step 100 of FIG. 1, several LOD representations of an object are stored. In one embodiment, the information stored for each LOD includes one or more geometrical entities (e.g., polygons) which represent an object to be displayed. Each geometrical entity represents a portion of the object. One of several well-known schemes may be used to generate such LOD representations.

Each LOD is referred to as LOD [n], wherein 'n' specifies an LOD level. According to one convention, the representations store progressively more detail of an object with a higher value of 'n.' The data stored in each LOD may correspond, for example, to the detail of an object perceived by a user, which (i.e., detail) may depend on the distance of the object from the viewpoint of the user. A finer LOD typically includes a greater number of geometrical entities than a coarser LOD.

For the purposes of explanation, the present invention is described by using a polygon as an example of a geometrical entity. Specifically, in the embodiments described herein, a triangle is used as the geometrical entity for purposes of discussion. However, it will be apparent to one skilled in the art how to practice the present invention with other types of geometrical entities (such as, for example, a single vertex, a line, n-sided polygons) without departing from the scope and spirit of the present invention.

In step 110, a data structure is used to define relationships between polygons in adjacent LODs. For example, each polygon at an LOD is associated with one or more polygons at a finer LOD. To display a portion of an object in a finer LOD, a polygon corresponding to the portion is replaced by the one or more associated polygons at the finer LOD level. An example data structure 200 is illustrated with reference to FIG. 2, which is described below.

Even though the storing of LODs and the definition of the corresponding data structure are described in two different steps, it will be appreciated that the LOD data and the corresponding data structure may be stored together in one logical and/or physical data structure or in more different physical and/or logical data structures.

In step 120, the data structure 200 is traversed to determine the set of polygons to render. When the set of polygons is rendered in step 130, the object represented by data structure 200 is displayed. As already noted, the polygons in the set may be from different LOD levels. In one embodiment, the determination of the polygons to be included in the set is based on three aspects: (1) Evaluation of a function(s) associated with each edge, (2) whether such replacement will result in adjacent polygons being displayed at an LOD difference of more than a predetermined level (e.g., one), and (3) the elimination of "T-vertices." However, it should be understood that the decision may be based on any of the three aspects independently of the other aspects.

As to (1) above, in one embodiment, a function is associated with each edge of a polygon. In an alternative embodiment, a single function may be associated with each polygon. In either case, the function can be user-defined and include several variables and associated weights. Each variable may contribute to a different degree according to the respective weight in the determination of whether to replace a polygon with polygons at a finer level as is further described with respect to FIG. 2. By enabling a user to define the functions, the present invention provides the user the control to selectively display portions of an object at a finer LOD.

If the value returned by the evaluation of a function equals a predetermined value (COMPLETE-MORPH), the corresponding polygon may be replaced by polygons at a finer LOD provided aspects (2) and (3) are also satisfied. According to the second aspect, a polygon may be replaced by polygons at a higher LOD only if such a replacement will not result in shared edges being displayed at an LOD difference of greater than one. By ensuring that adjacent polygons are displayed within a predetermined LOD difference, the present invention ensures that the level of detail across different portions of the object changes gradually.

Step 120 is explained in further detail below with reference to FIGS. 5A, 5B, 5C, 6 and 7. At the end of step 120, an embodiment in accordance with the present invention determines a set of triangles, the rendering of which generates an object corresponding to the LOD representations.

Figure 2:
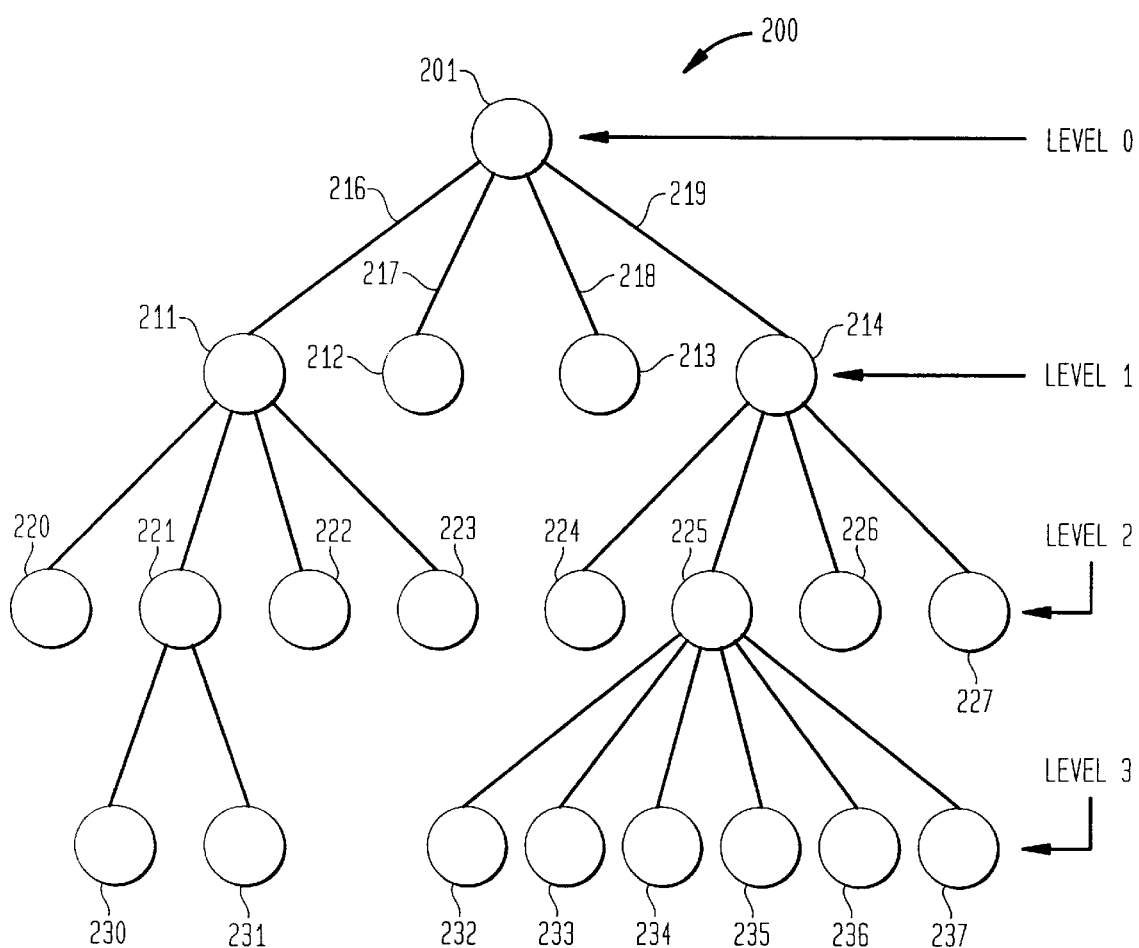
FIG. 2 is a diagram illustrating an example data structure in accordance with one embodiment of the present invention.

Referring now to FIG. 2, example data structure (tree) 200 is now described. Tree 200 is an example of a data structure described with reference to FIG. 1. Tree 200 defines the relationship between each polygon at a particular LOD with corresponding polygons at a adjacent LODs (i.e., the next coarser LOD and the next finer LOD). In one embodiment, the traversal of tree 200 (step 120) always flows from coarser LODs to finer LODs until the set of polygons to render is determined. Alternative embodiments of the data structure may include information to enable traversal in the reverse direction also, i.e., from finer LOD polygons to coarser LOD polygons. In another alternative embodiment, traversal of tree 200 begins with an intermediate LOD and proceeds toward both coarser and finer LODs. The relationships of tree 200 provide a framework for displaying an object in multiple LODs in accordance with the present invention.

In the example illustrated in FIG. 2, tree 200 is comprised of four levels, levels 0–3. Each level includes one or more nodes. For example, level 0 (corresponding to coarsest level, i.e., LOD [0]) includes only one node 201 and level 1 (corresponding to LOD [1]) includes four nodes. However, it should be understood that, in reality, each level typically may have up to several thousands of nodes or more to represent an object. In addition, tree 200 may form part of a larger data structure having both finer and coarser LODs than those represented in FIG. 2.

Each node stores information corresponding to a polygon in the LODs as is explained in further detail below. The information includes connectivity information for a polygon with polygons at adjacent LODs. Node 201 is shown connected to nodes 211, 212, 213, and 214 by branches 216, 217, 218, and 219 respectively. The connections indicate that node 201 is replaced by nodes 211, 212, 213, and 214 when the portion of the object represented by the polygon corresponding to node 201 is displayed at a finer LOD, i.e., LOD [1]. As will be appreciated, additional polygons, and thus additional vertices, may be displayed when an object is displayed at a finer LOD. The additional vertices are typically on the edges of the polygons of the coarser LOD. Conversely, polygons of nodes 211, 212, 213, and 214 may be replaced by the polygon of node 201 when it is determined that the object is to be displayed in LOD [0] rather than LOD [1]. In the description herein, the nodes and the corresponding polygons are referred to interchangeably.

In one embodiment of the present invention, information corresponding to vertices of a polygon and the related attributes is associated with each node. Because vertices are shared by more than one node, the embodiment may store a single copy of the information for a vertex, and then include a pointer in each node which indicates that the copy of the information also corresponds to the vertex in the node. The attribute information for each vertex can include the coordinate data (typically three dimensional), color information, normal information, light information, texture map information etc.

Figure 3:
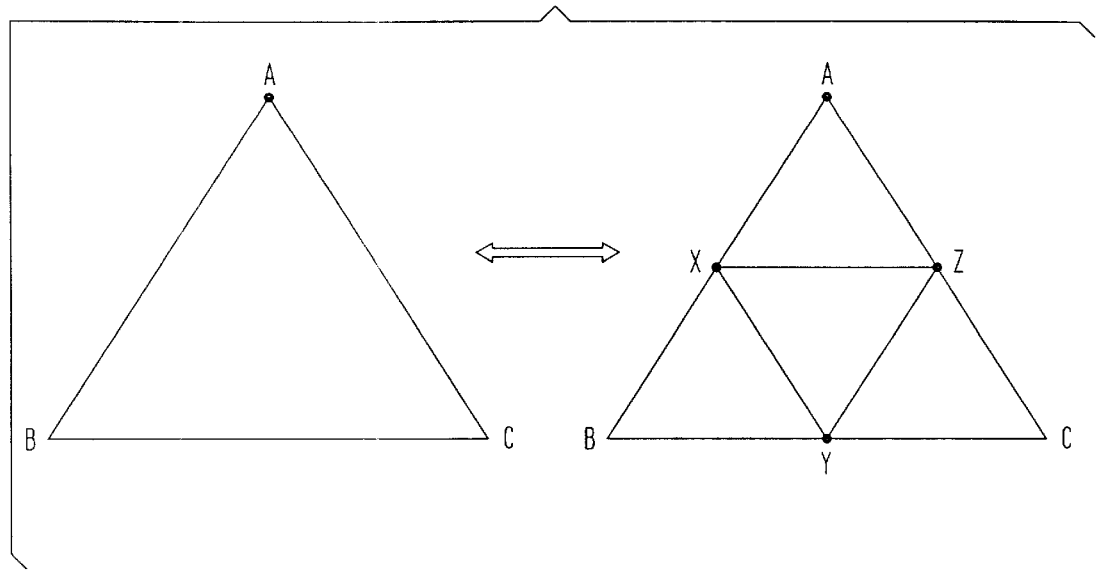
FIG. 3 is a diagram illustrating the replacement of a triangle with multiple triangles in one embodiment of the present invention.

The relationship between nodes in two adjacent LODs is further illustrated with an example in FIG. 3. For purposes of this discussion assume that triangle ABC corresponds to node 201, and triangles AXZ, BXY, CYZ and XYZ correspond respectively to nodes 211, 212, 213, and 214. When it is determined that the portion of the object corresponding to triangle ABC should be displayed in LOD [1] rather than LOD [0], node 201 is replaced by nodes 211–214; therefore, triangle ABC is replaced by triangles AXZ, BXY, CYZ and XYZ Nodes 211–214 include attribute information for vertices X, Y and Z that result from the change to a finer LOD.

Continuing with the description of the contents of each node of FIG. 2, a node stores information which relates each node to nodes at finer LODs. For example, for node 211, information is stored which indicates that node 211 is replaced by nodes 220–223 when the portion of an object corresponding to node 211 should be displayed at finer LOD. Similarly, for each of nodes 220–223, information may be stored which indicates that, for example, those nodes are replaced by node 211 when the portion of an object corresponding to node 211 should be displayed at coarser LOD. As illustrated in FIG. 2, a single polygon may be replaced by different number of polygons as desired by a designer of the data structure.

Figure 4:
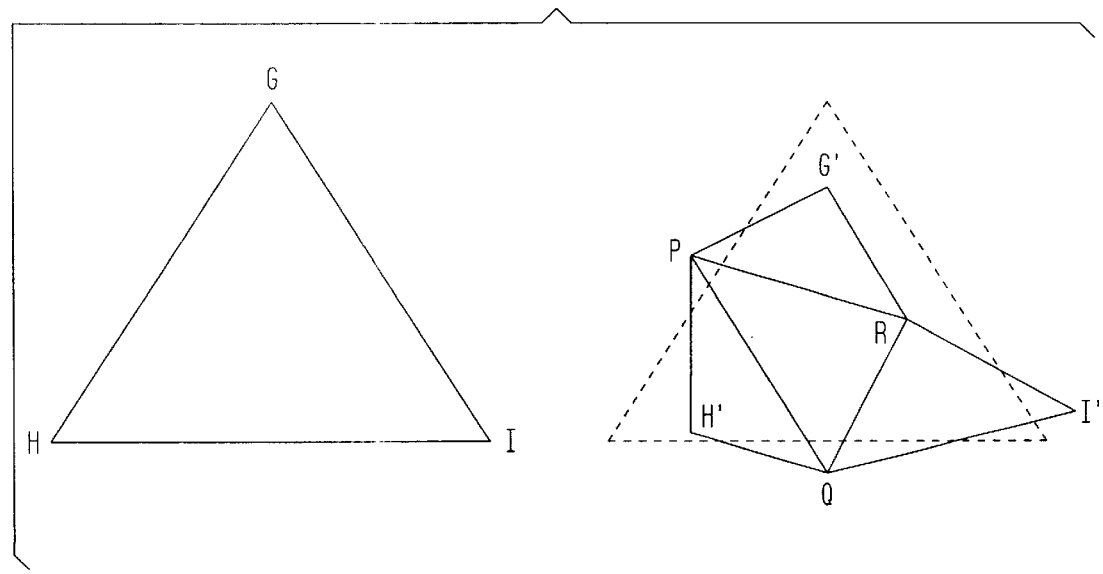
FIG. 4 is a diagram illustrating the manner in which a triangle may be replaced by another triangle with different coordinate data but maintaining the same topology according to one embodiment of the present invention.

The information stored in tree 200 of the present invention also enables vertices of a polygon to be moved to different positions. An example of this feature is illustrated in FIG. 4. For the purpose of this example, triangle GHI is assumed to correspond to node 211 of tree 200 of FIG. 2. When the display of a portion of an object corresponding to node 211 is changed from LOD [1] to LOD [2], vertices G, H, and I are moved to different positions G', H', and I'respectively, as shown in FIG. 4. To achieve such movement, the coordinate values of G', H', and I' are provided with values which correspond to the new positions.

In addition, triangle GHI is shown as being replaced by four triangles G'PR, PH'Q, QI'R, and PQR. The four triangles may respectively correspond to nodes 220–223. As each vertex is generally represented in three-dimensional space, the scheme illustrated with FIG. 4 may be used to represent objects in three dimensional space.

A function is associated generally with each edge of a node in tree 200 as noted with reference to step 120 of FIG. 1. The function is evaluated to generate a morph weight value. As will be appreciated, each edge may have different values that are applied to the function, and the evaluation of the same function to different edges may result in different morph weights. The morph weight value in turn is used to determine whether the corresponding polygon should be replaced with polygons at a different LOD. Thus, in the example of FIG. 3, the evaluation of a function corresponding to edge AB may result in a determination that edge AB is to be replaced with AX and BX. Functions for the other edges BC and AC are also evaluated to determine whether to replace triangle ABC with the four triangles AXZ, BXY, CYZ, and XYZ.

Even though an embodiment in accordance with the present invention may include a function for each edge of the triangle, it will be appreciated that such a function may be associated at different levels of granularity without departing from the scope and spirit of the present invention. For example, such a function may be associated with a portion of the tree or the whole tree or a subset of the nodes in the trees. Also, a function may be associated with each vertex or a triangle or a n-sided polygon.

A function may be based on several factors (or variables). For example, a function may specify that the display corresponding to a polygon is to be changed to a next (finer or coarser) LOD based on a combination of factors such as, for example, distance between the portion corresponding to the polygon and a view point, light intensity, light color, speed of approach of the object to the view point, perceptive level of a viewer, and direction of approach of a viewer.

In one embodiment, one of the factors includes the LOD at which an adjacent portion may be displayed. For explanation, assume that a bridge is displayed on a valley. It may be a requirement to display the bridge at the same (or approximately equal) LOD as the valley. Accordingly, the function corresponding to the bridge (edges or polygons) may have as one of the variables the LOD at which the valley is being displayed. This variable may be weighted by the designer according to the specific system requirements.

Each factor may be defined to contribute to a different degree in the decision of which LOD to use in displaying an object. For example, a function may be defined such that the distance of the view point has a weight of 0.4, light intensity has a weight of 0.3, the speed of approach has a weight of 0.2, and the perception level of a user has a weight of 0.1. It will be appreciated that a designer may provide any mathematical equation or equivalent as a function, and the functions may be evaluated to determine an LOD at which a portion of an object is to be displayed.

The morph weights are used to determine whether to transition the display of each node to a finer LOD. According to one convention, a morph weight may have a value between COMPLETE-MORPH and NO-MORPH. A value of COMPLETE-MORPH implies that the corresponding edge is suited for display at a finer LOD. A value of NO-MORPH implies that the edge is suited for display in the present LOD. In one embodiment, COMPLETE-MORPH is equal to 0 and NO-MORPH is equal to 1.

The present invention is explained mostly with reference to the breadth-first scheme of tree traversal. However, it will be apparent to one skilled in the relevant art to implement other schemes after reading the description provided herein. In the breadth-first scheme, traversal of tree 200 may always begin at LOD [0]. In this embodiment, the functions corresponding to the edges of node 201 are evaluated first. As traversal may always begin at LOD [0], such an embodiment may store the relationship of nodes corresponding to transitions from coarser LODs to finer LODs only. The relationships are used to determine whether to replace a geometrical entity with the corresponding geometrical entities as explained with reference to step 120 of FIG. 1.

Figure 7A:
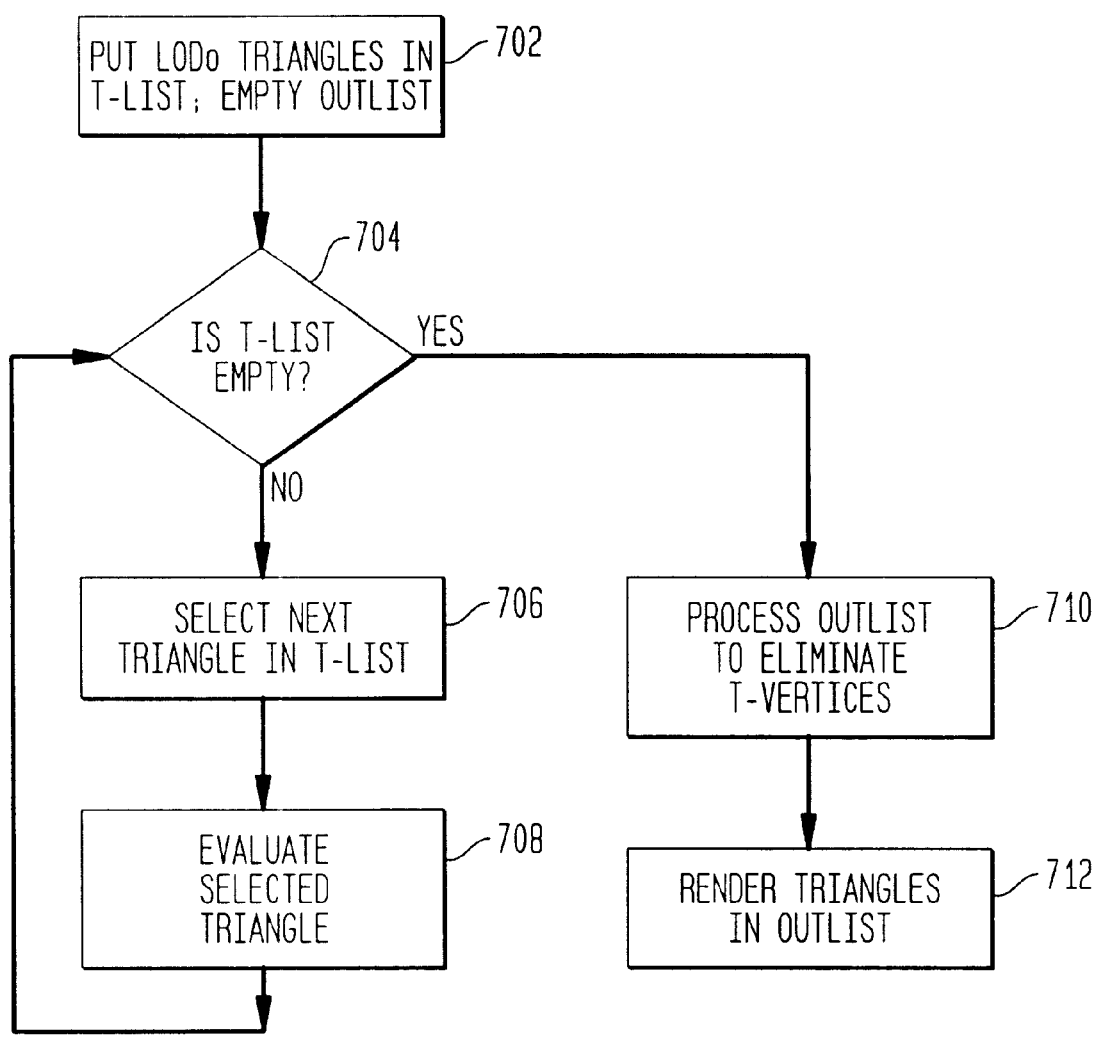
FIGS. 7A, 7B, and 7C together depict a flowchart illustrating a method for ensuring that adjacent polygons are not rendered with an LOD difference of greater than one according to one embodiment of the present invention.
Figure 7B:
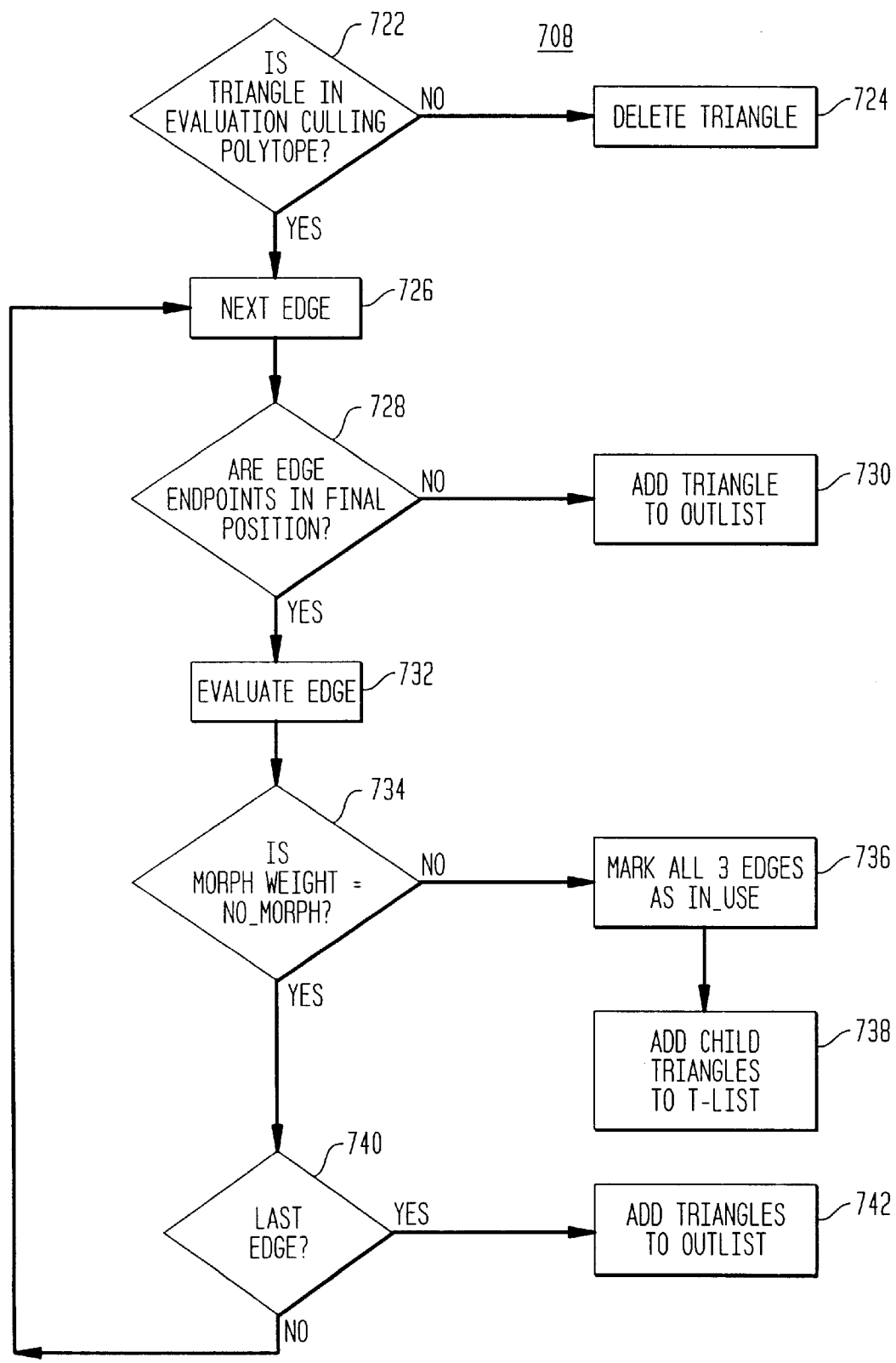
Figure 7C:
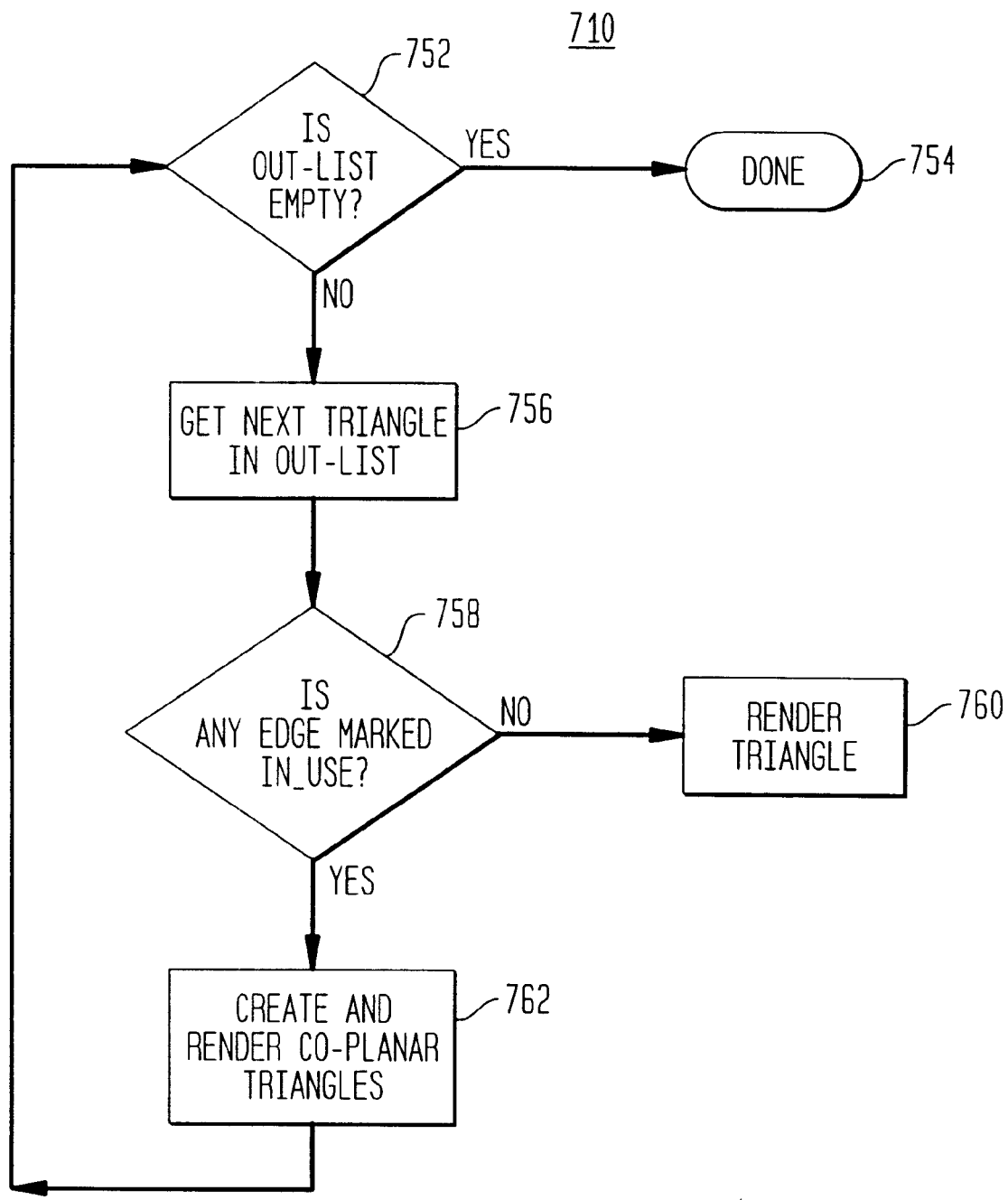

FIGS. 7A–C depict a flowchart illustrating an example process of implementing step 120 of FIG. 1 according to breadth-first scheme. The general principles underlying the process are first explained. Each of the steps of the flowchart are then explained in detail. As to the general principles, a polygon may be replaced polygons at a finer LOD subject to the following conditions: (1) Such a replacement does not result in T-vertices problem explained below, and (2) the LOD difference between neighboring polygons is less than a predetermined value. A breadth-first traversal of the data structure with these constraints is accomplished in one embodiment as explained below with reference to the flowchart of FIGS. 7A–C.

The flowchart begins with step 702, in which the list of triangles to be evaluated (T-List) is set to all the triangles in LOD [0], and the list of triangles to render (Out-List) is set to NULL, i.e., the list made empty. In step 704, it is determined whether the T-List is empty. When the T-List is empty, no more triangles need to be evaluated, and the Out-List contains the complete set of triangles to be rendered. As mentioned above, however, the renderable triangles must first be processed to eliminate T-vertices, as shown in step 710. This process is described below in conjunction with FIG. 7C. When the elimination of T-vertices is complete, the triangles in the Out-List can be rendered, as shown in step 712.

When the T-List is not empty, as indicated by the "NO" branch from step 704, a triangle in the T-list is selected for evaluation, as shown in step 706. The selected triangle is evaluated to determine whether it should be rendered in a different LOD, as shown in step 708. This process is described below in conjunction with FIG. 7B.

FIG. 7B is a flowchart depicting the evaluation of a selected triangle to determine whether it should be rendered in a different LOD; this process corresponds to step 708 in FIG. 7A. The process begins by determining whether the selected triangle is within the so-called "evaluation culling polytope." Before defining the evaluation culling polytope, it is useful to first explain the concept of a "viewing frustum."

In computer graphics, the objects within a scene can be stored in many ways. Before rendering the scene, it is necessary to specify certain parameters related to the perspective of the viewer, i.e., the perspective from which the scene should be displayed. One such parameter is the viewpoint, which specifies the viewer's location within the scene. Another such parameter is the viewing frustum, which is a delimiter between the objects the viewer can "see" and those he cannot. Because only the objects inside the viewing frustum need be rendered, those outside the viewing frustum can be ignored. By ignoring those objects outside the viewing frustum, considerable computing resources are conserved.

The situation is more complex when different LODs are employed. If the triangle selected for evaluation lies outside the evaluation culling polytope, the triangle is deleted from the T-list, as shown in a step 724.

If the selected triangle lies within the evaluation culling polytope, then one of its edges is selected for evaluation, as shown in step 726. In step 728, the endpoints of the selected edge are examined to determine whether they are in their final positions. In a preferred embodiment, a triangle may only be replaced by triangles at a lower LOD only if all of its vertices (i.e., the endpoints of its edges) are in their final positions (i.e., are completely morphed). Thus if the endpoints of the selected edge are not in their final positions, the triangle is placed in the OUT-LIST for rendering, as shown in a step 732.

As described above, the position of a vertex of a triangle is determined according to the morph weight of the edge of the parent triangle on which the vertex lies. For example, referring to FIG. 3, the position of vertex X of triangle XYZ is determined according to the morph weight of edge AB of triangle ABC. When the morph weight of edge AB is equal to COMPLETE_MORPH, then vertex X is in its final position.

In one embodiment, the position P of a vertex is determined according to the formula $$P=P_f+m \cdot dP$$

where m is the morph weight, $P_f$ is the final position of the vertex (i.e., when m is equal to COMPLETE_MORPH), and dP is a vector pointing from $P_f$ to the reference position of the vertex (i.e., the initial position of the vertex on the edge to be morphed when m is equal to NO_MORPH).

If the endpoints of the selected edge are in their final positions, then the morph weight of the selected edge is evaluated, as shown in step 732. If the morph weight of the selected edge is not equal to NO_MORPH, then the triangle should be replaced by triangles at a finer LOD. When this happens, it is possible that T-vertices may be created. For this reason, neighboring triangles (those that share an edge with the replaced triangle) are examined to determine whether they are affected by this phenomenon.

To ensure that this examination takes place, each of the edges of the triangle to be replaced are marked "$IN_{13}$ USE," as shown in step 736. The use of this marking to eliminate T-vertices is explained below in conjunction with FIG. 7C. Finally, the child triangles corresponding to the replaced triangle are added to the T-LIST, as shown in step 738. Because these triangles are added back to the T-List, they are subject to evaluation and may be replaced by triangles at a finer LOD.

Returning to step 734, if the morph weight of the selected edge is equal to $NO_{13}$ MORPH, then another edge is selected for evaluation, as shown in step 726. If all edges of a triangle return a morph weight value of NO-MORPH, the portion of an object is to be displayed in the present LOD level. Thus, if the edge just evaluated is the last edge of the selected triangle, then the triangle is added to the Out-List, as shown in step 742.

When all of the triangles in the T-List have been evaluated, the renderable triangles in the Out-List are processed to eliminate T-vertices. FIG. 7C is a flowchart depicting this process according to a preferred embodiment of the present invention; this process corresponds to step 710 of FIG. 7A. First the Out-List is examined to determine whether it contains any triangles to be evaluated, as shown in step 752. If not, then the process is complete, as shown in step 754.

However, if the Out-List contains any triangles, then one is selected for processing, as shown in step 756. If any edge of the selected triangle is marked "$IN_{13}$ USE," then that edge contains a T-vertex. A T-vertex on a triangle's edge is eliminated by replacing the triangle with two or more coplanar triangles, as shown in step 762 and depicted in FIGS. 5A–C.

Conversely, if the triangle selected in step 756 has no edges marked "$IN_{13}$ USE," it has no T-vertices and can be rendered. In one embodiment, termed "immediate mode," renderable triangles are rendered immediately. Accordingly, the triangle is rendered in step 760. In an alternative embodiment, termed "display list mode," renderable triangles are not rendered immediately, but rather are placed in a display list for future rendering, or rendering by another software module.

It will thus be appreciated that the present invention provides a data structure according to which the display of an object may be transitioned to different LODs. In addition, as each edge is provided a function which determines whether the edge is transitioned to a next LOD, different portions of the object may be displayed at different LODs.

Figure 5A:
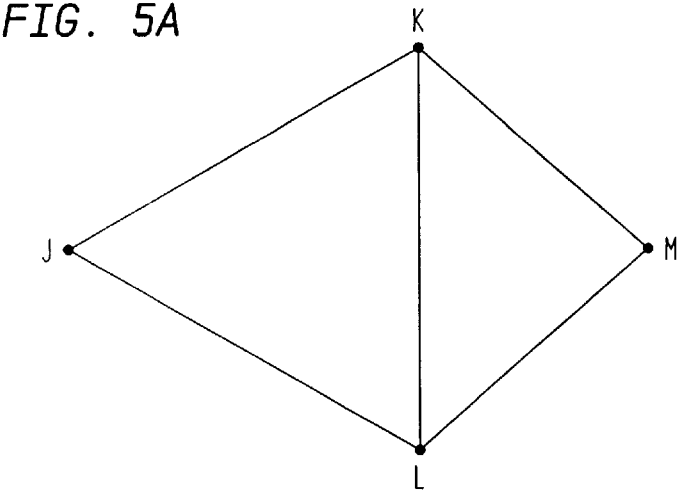
FIGS. 5A, 5B, and 5C are diagrams illustrating a phenomenon known as a T-vertex.

The purpose behind ensuring that adjacent triangles are rendered with an LOD difference of less than two is now explained. First, the T-vertices phenomenon is explained. The effect of greater LOD differences will then be explained. FIG. 5A is a diagram illustrating two triangles JKL and KLM with a common edge KL. Assume JKL and KLM correspond to nodes 211 and 214 of FIG. 2 for illustration. Further, assume that functions of edges JK and JL return a morph weight equal to COMPLETE-MORPH and that edges KL, KM, and LM return a morph weight equal to NO-MORPH.

Figure 5B:
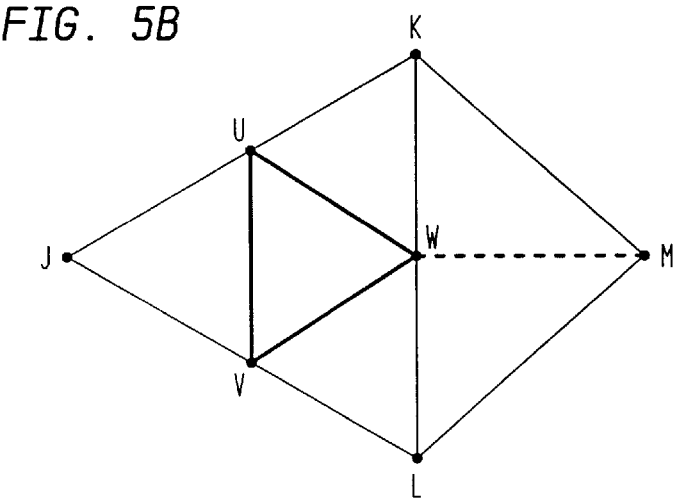

Because JK and JL need to be replaced by two edges each, triangle JKL is replaced by four triangles JUV, KUW, LVW, and UVW as shown in FIG. 5B. If triangle KLM is rendered (i.e., edges KL, LM, and KM) in combination with these four triangles, there may be a degradation in display quality as line edge KL may not align with edges KW and WL. Such alignment may not exist, for example, due to imprecisions in display technology (e.g., due to insufficient resolution on a display screen). As vertex W may not align exactly with line KL when displayed, a "hole" may result when displaying the portion of the object corresponding to the triangles shown in FIG. 5B. Vertices such as W are termed as T-vertices. Such holes are generally undesirable as the holes result in a degradation in display quality. Therefore, in a preferred embodiment of the present invention, coplanar triangles KWM and LWM are rendered instead of triangle LMK. Note that triangles KWM and LWM may not be represented as a single node in the data structure and accordingly line WM is shown as a dotted line.

Figure 5C:
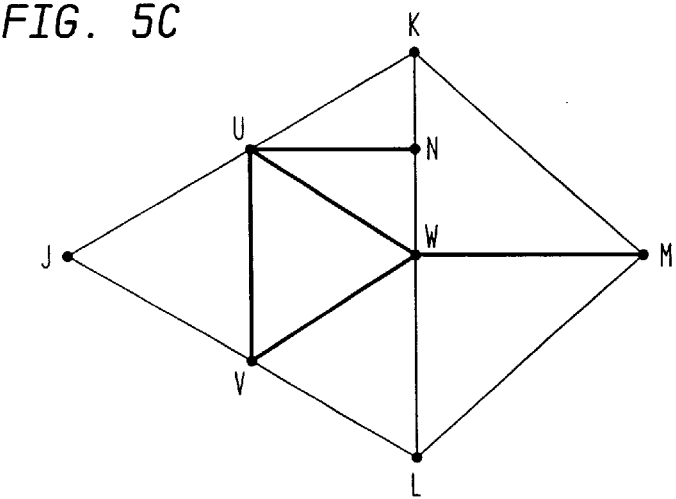

In addition, the processing overhead may be greater with a large difference of LOD levels between two adjacently rendered triangles as illustrated with reference to FIG. 5C. Assume for purposes of explanation that triangle KUW is further tesselated such that edge KW is further split into KN and NW. If triangle KLM is rendered without further replacement, larger holes may result as line KN, NW, and WL may not align exactly with line KL of triangle JKL, thereby resulting in a degradation of display quality. In addition, the processing algorithms may also become considerably complex if triangle KLM is replaced by KNM, NMW, and WLM. Therefore, an embodiment in accordance with the present invention may ensure that no adjacent triangles are rendered with a difference of more than one LOD as explained with reference to steps 728–732. This also has the effect of ensuring a smooth transition of LOD across different portions.

Figure 6:
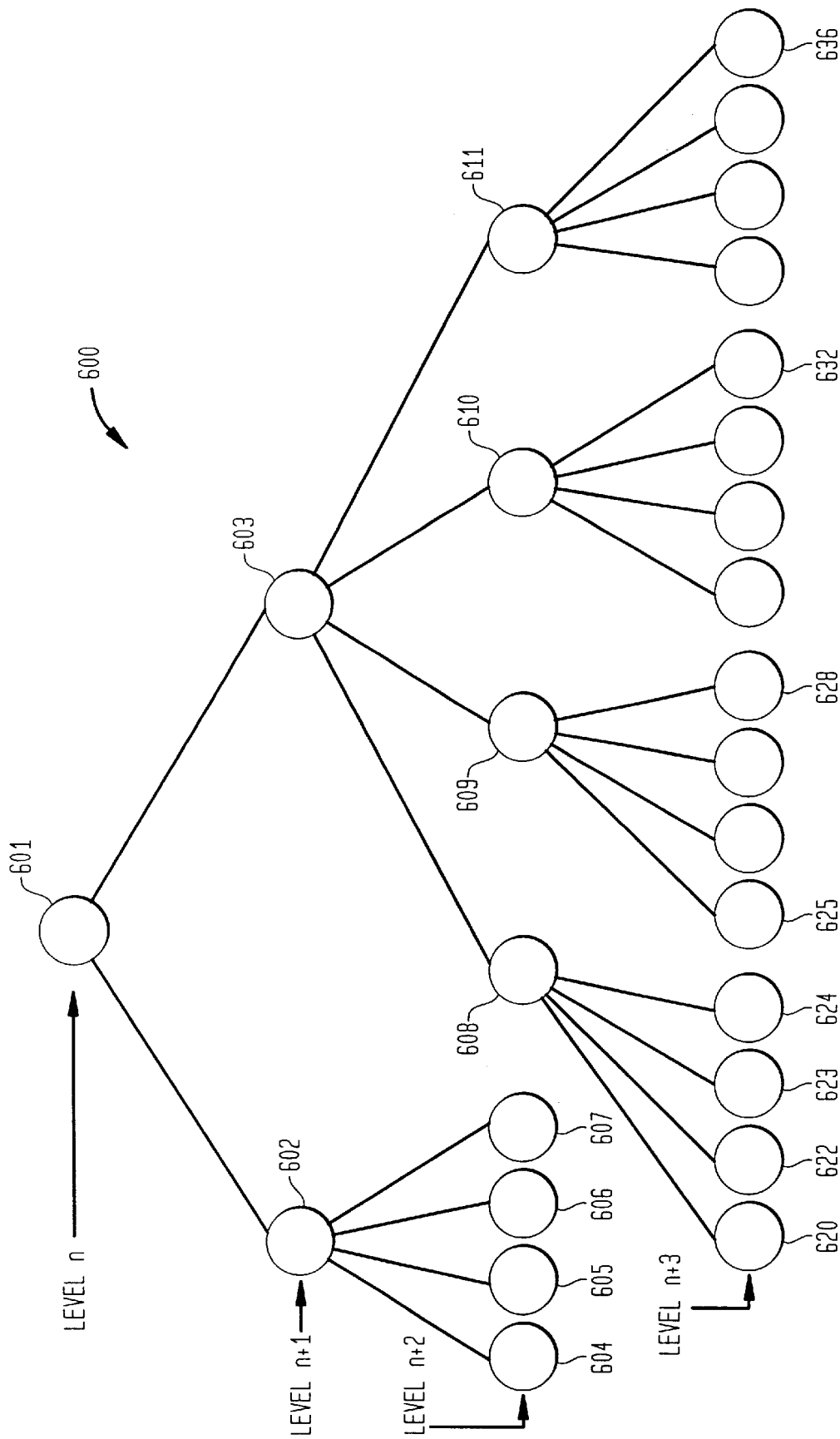
FIG. 6 is another example data structure illustrating the manner in which an embodiment of the present invention renders adjacent polygons with an LOD difference of less than or equal to one.

The operation of the flowcharts of FIGS. 1 and 7 is further illustrated with an example with reference to FIGS. 6, 5A, and 5B. Assume for purposes of explanation that JKL and KLM represent nodes 603 and 602 respectively of FIG. 6 at LOD [n+1]. Triangle JKL is replaced by the four triangles KUW, JUV, LVW, and UVW in FIG. 5B, as represented by nodes 608–611 respectively at LOD [n+2] in FIG. 6.

The nodes of FIG. 6 in the above example are now traversed using the flowchart of FIG. 7. Assume traversal begins at the LOD [n+1] and that vertices J, K, L, and M are all in their final positions. Assume that functions corresponding to edges JL, KL, KM, and LM return COMPLETE$_{13}$ MORPH but that edge JK returns NO-MORPH. Because at least one of the edges of triangle JKL returns NO-MORPH, triangle JKL is replaced by its child triangles JUV, LVW, KUW, and UVW, as shown in step 738, and edges JK, KL, and JL are marked "IN$_{13}$ USE," as shown in step 736. But because none of the edges of triangle KLM return NO-MORPH, triangle KLM is not replaced.

Assume further that each of the edges UV, VW, and WU return COMPLETE$_{13}$ MORPH, and that vertices U, V, and W are in their final positions. Accordingly, triangle UVW is not replaced by triangles at a finer LOD. At the end of this evaluation process, the list of triangles (Out-List) contains triangles JUV, LVW, KUW, UVW, and KLM. As mentioned above, triangles JUV, LVW, and KUW are at LOD[n+2] and triangle KLM is at LOD[n+1]. Thus, adjacent triangles have an LOD difference that is no greater than one.

Next, the list of triangles is processed to eliminate T-vertices, as shown in FIG. 7C. Vertex W is such a T-vertex. In step 758, triangle KLM is examined to determine whether any of its edges are marked "IN$_{13}$ USE." If so, that edge contains a T-vertex. As described above, edge KL was marked "IN$_{13}$ USE" when triangle JKL was replaced by triangles at a finer LOD. Assume that neither edge KM nor edge ML is marked "IN$_{13}$ USE." Thus, triangle KLM has only one edge marked "IN$_{13}$ USE," and so presents the single T-vertex case depicted by FIG. 5B. This case is remedied by rendering coplanar triangles KWM and WML, as indicated by the dashed line in FIG. 5B, and as shown in step 762. Accordingly, the triangles rendered are JUV, LVW, KUW, UVW, KWM and WML.

Figure 8:
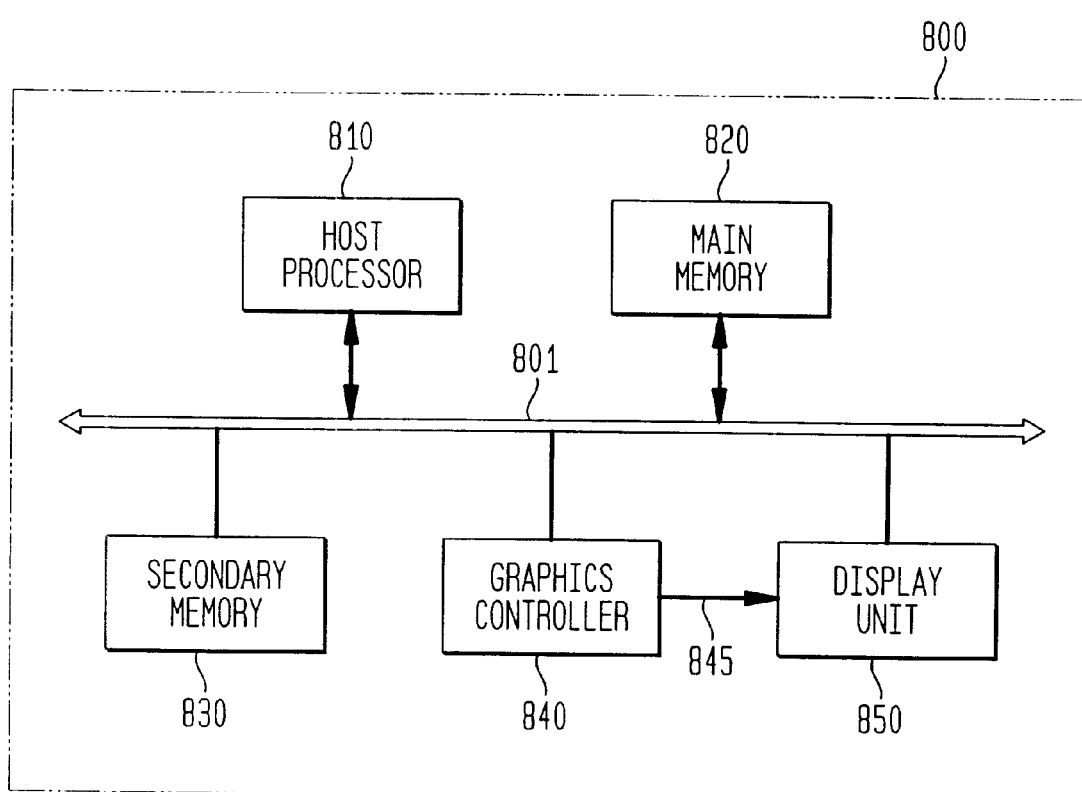
FIG. 8 is a block diagram of an example computer system for implementing the present invention.

The preferred embodiments and the alternative embodiments of the present invention described above are preferably implemented in a computer system 800 shown in FIG. 8. Computer system 800 includes one or more processors (CPUs such as host processor 810), main memory 820, secondary memory 830, graphics controller 840, and display unit 850. To operate in accordance with the flowchart of FIG. 1, computer system 800 may include a program for controlling the operation of the components. Electronic signals are usually generated for exercising such control. The program may be embodied either in firmware, hardware, software, or combination of two or more thereof.

The data structure corresponding to trees 600 (FIG. 6) and 200 (FIG. 2) may be stored in secondary memory 830 or main memory 820. If the data structure is stored in secondary memory 830, the computer system 800 may optionally retrieve portions or all of the data structure into main memory 820 while operating in accordance with the flowchart of FIG. 1. When stored in the main memory 820 or secondary memory 830 (step 100 of FIG. 1), the bits/data representing the data structure correspond to electrical signals which represent information. Such electrical signals are used to operate computer system 800 in accordance with the present invention.

Computer system 800 may retrieve and store the data structure in main memory 820 according to one of several schemes. One scheme is described in co-pending patent application entitled, "A System and Method for Storing and Accessing Data Representative of an Object in Various Levels-of-Detail," referred to in the section entitled "Related Applications," Serial No. 08/749,287, filed Nov. 13, 1996, and is incorporated by reference herein in its entirety.

With reference to FIGS. 1 and 8, an embodiment of computer system 800 may execute steps 100, 110, and 120 by sending control signals to host processor 810 based on a program stored in main memory 820 or secondary memory 830. The LOD data and the associated data structure may be received either from the secondary memory 830 or an external system by means of a network or other communication link. The received data may be stored in main memory 820. Step 130 may be executed by a combination of host processor 810 and graphics controller 840. Graphics controller 840 generates display signals to display unit 850 by rendering the nodes in the final set generated in step 120.

If computer system 800 includes a plurality of host processors, a main processor may operate in conjunction with graphics controller 840 to generate the display signals based on a set of polygons determined to be rendered in step 120. While the main processor and graphics controller 840 perform step 130, another processor may perform step 120 in parallel. As the traversal of the data structure may be computation intensive, such parallel processing enables computer system 800 to generate successive sets of polygons to be rendered in a fast and efficient manner. The backup processor stores an indication of the new sets of polygons to be rendered in main memory 820 in predetermined locations so as to enable the main processor and graphics controller 840 to generate display signals from the new set generated by the backup processor.

After reading this description, it will be apparent to a person skilled in the relevant art how to implement the invention using other circuits, software, computer systems, computer architectures and/or combinations of the like without departing from the scope and spirit of the present invention. For example, the present invention may be implemented in hardware components such as application specific integrated circuits (ASICs) or chip-sets. Also, the present invention may be embodied in chip-sets or special purpose systems such as entertainment systems provided by companies like Sega and Genesis. Implementation of a hardware state machine so as to perform the functions described herein will be apparent to persons skilled in the relevant art(s).

Secondary memory 830 can include, for example, a hard disk drive and/or a removable storage drive, representing a floppy disk drive, a magnetic tape drive, an optical disk drive, etc. The removable storage drive reads from and/or writes to a removable storage unit in a well known manner. Removable storage unit represents a floppy disk, magnetic tape, optical disk, etc., which is read by and written to by removable storage drive. As will be appreciated, the removable storage unit includes a computer usable storage medium having stored therein computer software and/or data.

In alternative embodiments, secondary memory 830 may include other similar means for allowing computer programs or other instructions to be loaded into computer system 800. Such means can include, for example, a removable storage unit and an interface. Examples can include a program cartridge and cartridge interface, a removable memory chip (such as an EPROM, PROM, or PCMCIA) and associated socket, and other removable storage units which allow software and data to be transferred from the removable storage unit to computer system 800. Any of the aforementioned memory devices can be used to implement a database.

The present invention is preferably implemented using software running (that is, executing) in an environment similar to that described above with respect to FIG. 8. Thus, the term "computer program product" is used to generally refer to a program stored at a removable storage device or a hard disk installed in a hard disk drive. These computer program products are means for providing software to computer system 800.

Such computer programs, when executed, enable computer system 800 to perform the features of the present invention as discussed herein. In particular, the computer programs, when executed, enable processor 810 to perform the features of the present invention. Accordingly, such computer programs represent controllers of computer system 800.

In an embodiment where the invention is implemented using software, the software may be stored in a computer program product and loaded into computer system 800 using a removable storage drive or hard drive. Alternatively, the computer program product may be downloaded to computer system 800 over a network or modem or RF link or optical link or the like. The control logic (software), when executed by processor 810, causes the processor 810 to perform the functions of the invention as described herein.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of displaying an object in different levels of detail, the method comprising the steps of:
   receiving a plurality of levels of detail of an object including a first level of detail and a second level of detail, each of said plurality of levels of detail comprising one or more geometrical entities;
   receiving a data structure which associates each of the one or more geometrical entities in said first level of detail with one or more geometrical entities in said second level of detail, wherein said data structure further provides one or more functions for each of the one or more geometrical entities in said first level of detail;
   traversing the data structure to determine a plurality of geometrical entities representative of the object such that different portions of the object are represented in different levels of detail, the step of traversing further comprising the steps of
      evaluating each function of a geometrical entity in said first level of detail to generate a corresponding morph weight,
      determining whether to replace said geometrical entity in said first level of detail with the associated one or more geometrical entities in said second level of detail according to said morph weight, and
      ensuring that adjacent geometrical entities have a level of detail difference of less than a predetermined number; and
   rendering the plurality of geometrical entities such that different portions of the object are displayed in different levels of detail.

2. The method of claim 1, wherein said data structure comprises a tree with a plurality of levels with each level comprising one or more nodes, and wherein the nodes at each level of the tree correspond to a level of detail of the object.

3. The method of claim 2, wherein each geometrical entity comprises a polygon and wherein the data structure provides a function for each edge of the polygon.

4. The method of claim 3, wherein each polygon comprises a triangle.

5. The method of step 4, wherein said step of traversing the tree further comprises said step of beginning traversal of the tree at the coarsest level of detail.

6. The method of claim 4, wherein said step of traversing the data structure further comprises the step of traversing the tree in a breadth-first scheme.

7. The method of claim 4, wherein said step of determining comprises the further step of replacing each triangle in a coarser level of detail by a plurality of triangles in a finer level of detail.

8. The method of claim 3, wherein said step of ensuring further comprises the step of rendering a particular polygon when a vertex of said particular polygon is not in its final position.

9. The method of claim 1, wherein said step of ensuring further comprises the step of replacing a particular polygon with associated polygons at a finer level of detail when an edge of said particular polygon is not to be morphed.

10. The method of claim 8, further comprising the steps of:
    marking each edge of said particular polygon to indicate potential T-vertices; and
    replacing each polygon having a marked edge with two or more coplanar polygons.

11. The method of claim 9, further comprising the steps of:
    determining whether an adjacent polygon of a given polygon is to be rendered at a finer level of detail; and
    replacing said given polygon with a plurality of polygons such that each vertex of a child polygon of said adjacent polygon that lies on the edge shared by said adjacent and given polygons is common to one of said plurality of polygons.

12. The method of claim 7, wherein said ensuring step comprises the steps of:
    replacing each triangle with triangles in a finer level of detail recursively according to the morph weights of the edges of the triangles to generate a proposed set of triangles to render;
    selecting a triangle with the coarsest level of detail in the proposed set of triangles;
    determining any adjacent triangles to said selected triangle; and
    replacing each adjacent triangle and the siblings of said each adjacent triangle with the parent triangle of said each adjacent triangle and said siblings.

13. A system for displaying an object in different levels of detail, the system comprising:
    means for storing a plurality of levels of detail of an object including a first level of detail and a second level of detail, each of said plurality of levels of detail comprising one or more geometrical entities;
    means for storing a data structure which associates each of the one or more geometrical entities in said first level of detail with one or more geometrical entities in said second level of detail, wherein said data structure further provides one or more functions for each of the one or more geometrical entities in said first level of detail;
    means for traversing the data structure to determine a plurality of geometrical entities representative of the object such that different portions of the object are represented in different levels of detail, said means for traversing further comprising
       means for evaluating each function of a geometrical entity in said first level of detail to generate a corresponding morph weight,
       means for determining whether to replace said geometrical entity in said first level of detail with the associated one or more geometrical entities in said second level of detail according to said morph weight, and
       means for ensuring that adjacent geometrical entities have a level of detail difference of less than a predetermined number; and means for rendering the plurality of geometrical entities such that different portions of the object are displayed in different levels of detail.

14. The system of claim 13, wherein said data structure comprises a tree with a plurality of levels with each level comprising one or more nodes, and wherein the nodes at each level of the tree correspond to a level of detail of the object.

15. The system of claim 14, wherein each geometrical entity comprises a polygon and wherein the data structure provides a function for each edge of the polygon.

16. The system of claim 15, wherein each polygon comprises a triangle.

17. The system of step 16, wherein said means for traversing the tree further comprises means for beginning traversal of the tree at the coarsest level of detail.

18. The system of claim 16, wherein said means for traversing the data structure further comprises means for traversing the tree in a breadth-first scheme.

19. The system of claim 16, wherein said means for determining comprises means for replacing each triangle in a coarser level of detail by a plurality of triangles in a finer level of detail.

20. The system of claim 15, wherein said means for ensuring further comprises means for rendering a particular polygon when a vertex of said particular polygon is not in its final position.

21. The system of claim 13, wherein said means for ensuring further comprises means for replacing a particular polygon with associated polygons at a finer level of detail when an edge of said particular polygon is not to be morphed.

22. The system of claim 20, further comprising:

means for marking each edge of said particular polygon to indicate potential T-vertices; and means for replacing each polygon having a marked edge with two or more coplanar polygons.

23. The system of claim 21, further comprising:

means for determining whether an adjacent polygon of a given polygon is to be rendered at a finer level of detail; and means for replacing said given polygon with a plurality of polygons such that each vertex of a child polygon of said adjacent polygon that lies on the edge shared by said adjacent and given polygons is common to one of said plurality of polygons.

24. The system of claim 19, wherein said means for ensuring comprises:

means for replacing each triangle with triangles in a finer level of detail recursively according to the morph weights of the edges of each triangle to generate a proposed set of triangles to render;

means for selecting a triangle with the coarsest level of detail in the proposed set of triangles;

means for determining any adjacent triangles to said selected triangle; and means for replacing each adjacent triangle and the siblings of said each adjacent triangle with the parent triangle of said each adjacent triangle and said siblings.

* * * * *

UNITED STATES PATENT AND TRADEMARK OFFICE
CERTIFICATE OF CORRECTION

PATENT NO. : 6,348,921 B1  
DATED : February 19, 2002  
INVENTOR(S) : Zhao et al.

It is certified that error appears in the above-identified patent and that said Letters Patent is hereby corrected as shown below:

Title page,  
Item [54], Title, before "SYSTEM" insert therefor -- A --.  
Item [56], References Cited, after "5,999,187" add -- 6,018,347 --; and after "5,999,187" add -- 6,057,849 A --.

Column 1,  
Line 7, after "Jul. 23, 1997" insert --, now abandoned, --.  
Line 11, delete "60/015,354" insert -- 6,018,347 --.

Column 9,  
Line 27, delete "IN $_{13}$ USE," and insert therefor -- IN_USE, --.  
Line 36, delete "IN$_{13}$ MORPH," and insert therefor -- NO_MORPH, --.  
Lines 54 and 60, delete "IN$_{13}$ USE," and insert therefor -- IN_USE, --.

Column 10,  
Line 66, delete "COMPLETE$_{13}$ MORPH" and insert therefor  
-- COMPLETE_MORPH --.

Column 11,  
Lines 3 and 23, delete "IN$_{13}$ USE," and insert therefor -- IN_USE, --.  
Line 7, delete "COMPLETE$_{13}$ MORPH," and insert therefor  
-- COMPLETE_MORPH --.  
Lines 18 and 22, delete "IN$_{13}$ USE." and insert therefor -- IN_USE. --.  
Line 20, delete "IN$_{13}$ USE" and insert therefor -- IN_USE --.

Signed and Sealed this

Twenty-ninth Day of October, 2002

*Attest:*

*Attesting Officer*

JAMES E. ROGAN  
*Director of the United States Patent and Trademark Office*